(12) United States Patent
Amacker et al.

(10) Patent No.: US 10,723,027 B2
(45) Date of Patent: Jul. 28, 2020

(54) ROBOT SYSTEMS INCORPORATING CLOUD SERVICES SYSTEMS

(71) Applicant: Toyota Research Institute, Inc., Los Altos, CA (US)

(72) Inventors: Matthew Amacker, Santa Clara, CA (US); Arshan Poursohi, Berkley, CA (US); Allison Thackston, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/053,165

(22) Filed: Aug. 2, 2018

(65) Prior Publication Data

US 2019/0091865 A1    Mar. 28, 2019

Related U.S. Application Data

(60) Provisional application No. 62/563,424, filed on Sep. 26, 2017.

(51) Int. Cl.
*B25J 9/16* (2006.01)
*B25J 9/00* (2006.01)

(52) U.S. Cl.
CPC ........... *B25J 9/1689* (2013.01); *B25J 9/0003* (2013.01); *B25J 9/1664* (2013.01); *B25J 9/1697* (2013.01)

(58) Field of Classification Search
CPC combination set(s) only.
See application file for complete search history.

(56) References Cited

U.S. PATENT DOCUMENTS

| | | | |
|---|---|---|---|
| 8,798,791 B2* | 8/2014 | Li | G05D 1/0297 700/248 |
| 8,965,104 B1* | 2/2015 | Hickman | G06T 7/00 382/153 |
| 9,031,692 B2* | 5/2015 | Zhu | H04L 67/12 700/246 |
| 9,205,886 B1* | 12/2015 | Hickman | G05D 1/0246 |
| 9,355,368 B2* | 5/2016 | Djugash | G06F 19/3418 |
| 9,751,211 B1* | 9/2017 | Saunders | B25J 9/1602 |
| 2015/0019013 A1* | 1/2015 | Rose | G01L 1/16 700/258 |
| 2015/0323699 A1* | 11/2015 | Gariepy | H04L 51/04 702/2 |

(Continued)

FOREIGN PATENT DOCUMENTS

WO    2017115385 A2    7/2017

*Primary Examiner* — Bhavesh V Amin
(74) *Attorney, Agent, or Firm* — Dinsmore & Shohl LLC

(57) ABSTRACT

Robot systems including a robot, an on-premise computing device, and a cloud services system are disclosed. An on-premise computing device includes a processor and a non-transitory memory device storing machine-readable instructions that, when executed by the processor, cause the processor to receive raw sensor data from a robot, pre-process the sensor data to remove unnecessary information from the sensor data and obtain pre-processed data, transmit the pre-processed data to a cloud services system, receive, from the cloud services system, an object type, an object pose, and an object location of an object corresponding to the pre-processed data, and transmit a signal to the robot based on at least one of the object type, the object pose, and the object location of the object.

20 Claims, 8 Drawing Sheets

(56) References Cited

U.S. PATENT DOCUMENTS

2016/0288328 A1* 10/2016 Bingham ............... G06Q 10/20
2018/0365533 A1* 12/2018 Sathyanarayana ..... G06N 20/00
2019/0091865 A1* 3/2019 Amacker ............... B25J 9/1689

* cited by examiner

ROBOT SYSTEMS INCORPORATING CLOUD SERVICES SYSTEMS

CROSS-REFERENCE TO RELATED APPLICATION

The present application claims priority to U.S. Provisional Patent Application Ser. No. 62/563,424, filed Sep. 26, 2017 and entitled "ROBOT SYSTEMS INCORPORATING CLOUD SERVICES SYSTEMS," which is incorporated by reference herein in its entirety.

TECHNICAL FIELD

Embodiments described herein generally relate to robots and, more particularly, robots that use object recognition to assist humans in an environment.

BACKGROUND

Robots may be deployed in an environment to assist humans in tasks. For example, healthcare robots may be deployed to assist disabled, sick, or elderly people in everyday tasks. The robots may receive instructions from users to perform certain tasks. For example, a user may ask a robot to retrieve a certain object. The robot may use computer vision to locate the object, navigate the environment, and bring the object to the user.

Currently, robots use a local processing device located within the robot to process the inputs that are received, process data that is obtained from sensors, and/or the like. The amount of processing power necessary to carry out the above-mentioned tasks can be detrimental to the functionality of the robot because it can quickly drain the battery, slow the robot's response times, and/or the like. As such, there exists a need to minimize the amount of processing power completed by the robot.

SUMMARY

In one embodiment, an on-premise computing device includes a processor and a non-transitory memory device storing machine-readable instructions that, when executed by the processor, cause the processor to receive raw sensor data from a robot, pre-process the sensor data to remove unnecessary information from the sensor data and obtain pre-processed data, transmit the pre-processed data to a cloud services system, receive, from the cloud services system, an object type, an object pose, and an object location of an object corresponding to the pre-processed data, and transmit a signal to the robot based on at least one of the object type, the object pose, and the object location of the object.

In another embodiment, a cloud services system including a processor and a non-transitory memory device storing machine-readable instructions that, when executed by the processor, cause the processor to receive pre-processed data from an on-premise computing device, determine an object type, an object pose, and an object location of an object from the pre-processed data, and transmit the object type, the object pose, and the object location to the on-premise computing device. The pre-processed data is data that has been extracted by the on-premise computing device from raw sensor data that originated from a robot.

In yet another embodiment, a method of controlling a robot includes receiving raw sensor data from the robot at an on-premise computing device, reducing, by the on-premise computing device, a size of the sensor data to generate processed sensor data, transmitting, by the on-premise computing device, the processed sensor data to a cloud services system, receiving, by the on-premise computing device, an object type, an object pose, and an object location from the cloud services system, and transmitting, by the on-premise computing device, a signal to the robot based on at least one of the object type, the object pose, and the object location of the object. The object type, the object pose, and the object location is determined by the cloud services system from the processed sensor data.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein are directed to robot systems configured to perform robotic services, such as, for example, object recognition and location, in a remote computing device such that processing requirements on the robot are reduced, and information obtained from a collective group of robots may be shared and utilized by other robots in the robot system. Storing information detected by a collective group of robots in a single remote location allows for enhanced machine learning, thereby leading to enhanced robotic features. In other words, robots using the robot systems described herein may enable the robots to learn from one another. Further, by off-loading computationally expensive tasks such as object recognition from the robot, the robot may have reduced power needs and thus operate longer on a single battery charge. Embodiments described herein provide processing tasks for various remote robot services, such as, but not limited to, object de-duplication, grasp planning trajectories, object characteristics (e.g., object dimensions), user authentication, object locations, user natural speech processing, behavior development, and/or the like.

As described in more detail below, in some embodiments, a robot system includes a robot communicatively coupled to an on-premise computing device that performs some computational tasks, such as object recognition, thereby relieving the robot of such computational tasks. The on-premise computing device is further communicatively coupled to a remote cloud services system that is further configured to perform computational tasks, and provide data to the robot via the on-premise computing device.

Particularly, robots may be deployed to assist humans in a variety of tasks. In one example, factory robots are deployed in factories to perform repetitive tasks in the manufacture of goods. As another example, a robot may be deployed in human occupied spaces, such as homes, special care facilities, and hospitals. These robots may share the same space as people for purposes such as general assistance and companionship. For example, a robot may be deployed in the home of a person needing physical assistance, such as an elderly person, a handicapped person, or an injured person. The robot may be mobile and have actuators capable of retrieving objects for the person, for example. Such robots may make the person feel more independent because he or she may be less reliant on other people for support.

Figure 1:
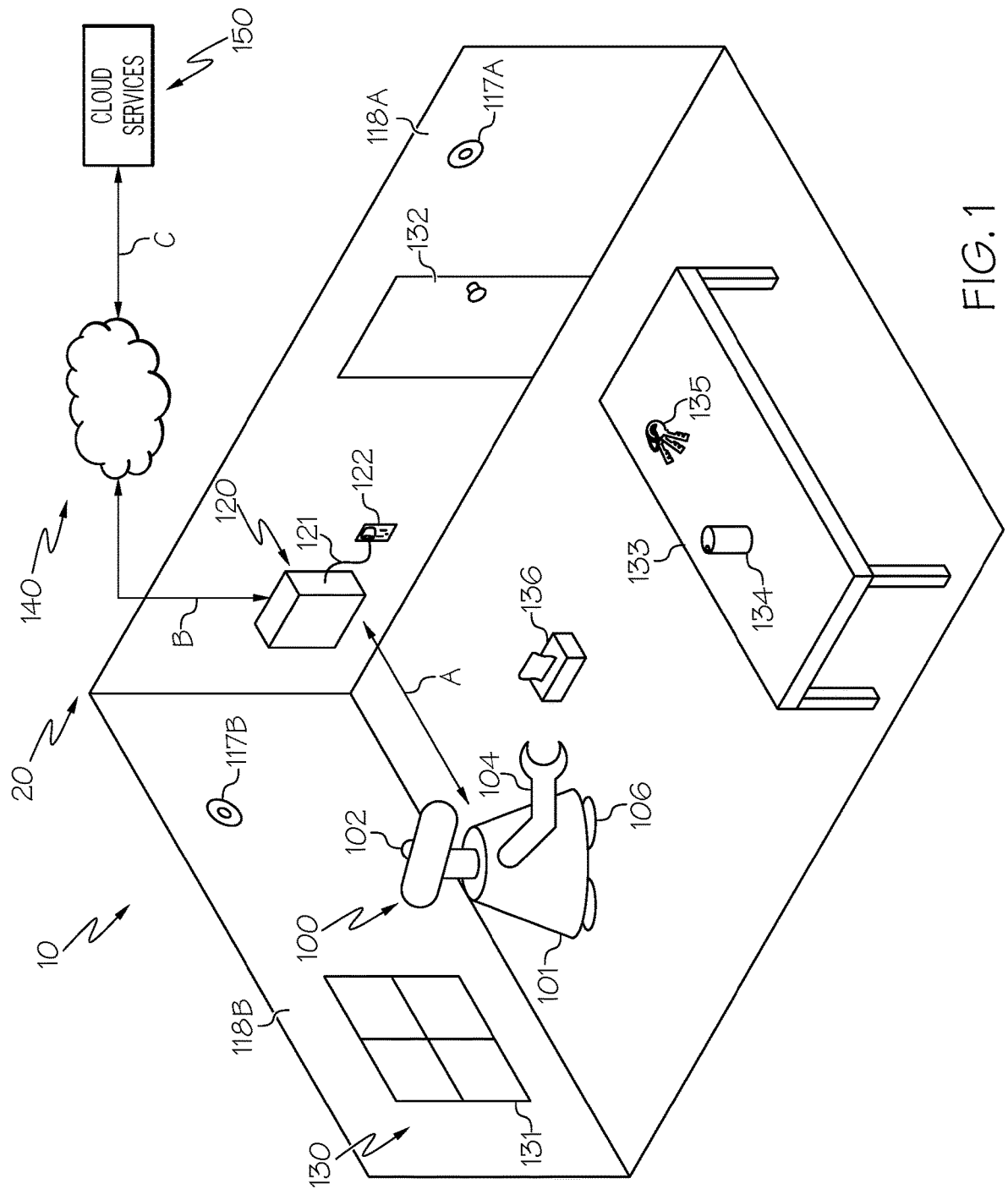
FIG. 1 schematically depicts an illustrative robot system operating in an environment according to one or more embodiments described and illustrated herein.

Referring now to FIG. 1, an illustrative robot 100 according to embodiments may be deployed in a human-occupied space, such as a home 10. The robot 100 generally has a body 101 supported on one or more motorized wheels 106 (or other mobility components such as propellers, wings, skis, a continuous track, and/or the like) capable of moving the robot 100 throughout the home 10. The robot 100 further has one or more arms 104, each having an end effector (e.g., a gripper, a robotic hand, and/or the like) capable of manipulating objects. Additionally, the robot 100 has a plurality of sensors 102 capable of producing sensor data that assists the robot 100 in detecting objects, manipulating objects, and/or navigating an environment. The plurality of sensors 102 may include, but are not limited to, cameras (e.g., CCD cameras), infrared sensors, depth sensors, proximity sensors, tactile sensors, Lidar sensors, radar sensors, time of flight sensors, and/or the like. It should be understood that the robot 100 shown in FIG. 1 is provided for illustrative purposes only, and that the configuration of the robot is not limited by the present disclosure.

As stated above, the robot 100 may be configured, for example, to assist a user residing in the home 10. That is, the user may instruct the robot 100 to perform certain tasks, such as retrieve an object, bring an object to the user, move the object to a different location, change the positioning of an object, and/or the like. The user may instruct the robot 100 in a variety of ways. In one example, the user may say "Robot, please find the tissue box and bring it to me," which is received by a microphone associated with the robot 100. In another example, the user may use a computing device, such as a personal computer, a tablet, a smartphone, an application specific computing device, or the like, to control the robot. For example, the computing device may have a display that illustrates the objects within a room 130 of the home 10, and the user may select a graphical representation of the object and also select a task, such as asking the robot 100 to bring the object to the user. As another example, the display of the computing device may graphically illustrate what imaging devices associated with the robot 100 sense such that the user may control movement of the robot 100 in the environment, and the display shows the locations of objects as they are imaged by the robot 100. The user may then select one or more objects and request completion of one or more tasks.

Still referring to FIG. 1, there may be many objects within the environment. In the illustrated example, there is a window 131, a door 132, a table 133, a soda can 134 and a set of keys 135 on the table 133, and a tissue box 136 on the floor of the home 10. The robot systems 20 described herein are capable of detecting the type of each object, the location of each object, and the pose of each object. In this manner, the robot 100 has information relating to where each object is located in the home 10, and is capable of retrieving the object or otherwise performing a manipulation of the object upon receiving a request.

The robot 100 is thus capable of object recognition using data provided by one or more sensors 102. For example, the robot system 20 may use one or more object detection algorithms to determine the type, pose, and location of a particular object. Any known or yet-to-be-developed object recognition algorithms may be utilized. Non-limiting object recognition algorithms include edge detection algorithms, corner detection algorithms, blob detection algorithms, feature description algorithms, and/or the like. Any computer-vision method of detecting the type and pose of objects may also be utilized.

Because the robot 100 has information relating to the location of itself and other robots and/or sensors within the environment (e.g., the home 10 depicted in FIG. 1), the robot system 20 may use the data from the sensors 102 to determine a location of a particular object within the environment. For example, depth information and information relating to a direction in which a particular sensor(s) is aimed may be utilized to determine a location of a particular object.

In some embodiments, one or more additional sensors may also be deployed within the environment, where such additional sensors are not physically attached to the robot 100. Such additional sensors may, for example, provide the robot system 20 with additional sensor data. Referring to FIG. 1, a first additional sensor 117A is provided on a first wall 118A and a second additional sensor 117B is provided on a second wall 118B. It should be understood that any number of additional sensors may be provided, and the additional sensors may be any type of sensor capable of providing additional data to the robot system 20. For example, the additional sensors may be, but are not limited to, image capture devices, Lidar systems, motion sensing devices, light sensing devices, and/or the like.

As stated above, the various computing processes required for the robot 100 to complete requested tasks are computationally expensive. As a result, such tasks may require a significant amount of computing power and/or a significant amount of electrical energy. Thus, these computing processes may quickly deplete the electrical energy stored within one or more batteries of the robot 100, thereby requiring that the robot 100 be frequently recharged or tethered to an electrical outlet, which significantly reduces the mobility of the robot 100.

Various embodiments described herein off-load some of these computing processes from the robot 100 onto other components within the robot system 20. Still referring to FIG. 1, the illustrative robot system 20 includes at least one on-premise computing device 120 that is communicatively coupled to the robot 100 (or, in some cases, multiple robots) within the home 10. The on-premise computing device 120 may communicate with the robot 100 by a wired or wireless connection, as indicated by a first communications connection A between the robot 100 and the on-premise computing device 120. As used herein, the term "on-premise" means that the computing device is located within a general vicinity of the robot 100 (i.e., the robot 100 is a co-located robot). For example, the on-premise computing device 120 may be located in the same room 130, in the same building, in the same complex, in the same compound, within a particular distance (e.g., within 100 feet, 100 yards, or the like). It should be understood that "on-premise" specifically excludes remote servers that are not in the same vicinity of the robot 100.

In the illustrated embodiment, the on-premise computing device 120 communicates with a remote cloud services system 150 by way of a communications network 140, such as, for example, the Internet, an intranet, a virtual private network, and/or the like. The on-premise computing device 120 may communicate with the communications network 140 via any method, such as via a cellular network or an Internet service provider. Communications between the on-premise computing device 120 and the remote cloud services system 150 is indicated by a second communications connection B between the on-premise computing device 120 and the communications network 140 and a third communications connection C between the communications network 140 and the remote cloud services system 150.

The on-premise computing device 120 is electrically coupled to an external power source, such as the electrical grid. For example, as shown in FIG. 1, the on-premise computing device 120 has an electrical cord 121 that plugs into an AC outlet 122 to receive electrical power. Thus, the on-premise computing device 120 is not battery powered and therefore does not need to be recharged. The on-premise computing device 120 may therefore perform the intensive graphics processing by drawing electrical power from the power grid or some other external electrical power source.

In some embodiments, computing processes that are performed to effectuate the control of the robot 100 to perform requested tasks (e.g., retrieve an object and/or the like) may be distributed among the robots 100, the on-premise computing device 120, and the remote cloud services system 150. It should be understood that any of the computing processes may be performed on the robot 100, the on-premise computing device 120, and/or the remote cloud services system 150. In some embodiments, the computing precessess may be allocated to one or more of the robot 100, the on-premise computing device 120, and/or the remote cloud services system 150 based on the respective availabilities of the robot 100, the on-premise computing device 120, and the remote cloud services system 150 to handle processes. That is, if one or more of the robot 100, the on-premise computing device 120, and the remote cloud services system 150 is overloaded or otherwise unable to handle a particular process, such process may be offloaded to another one of the robot 100, the on-premise computing device 120, and the remote cloud services system 150 as needed. As such, the robot 100, the on-premise computing device 120, and the remote cloud services system 150 may share processing power as needed.

Figure 2:
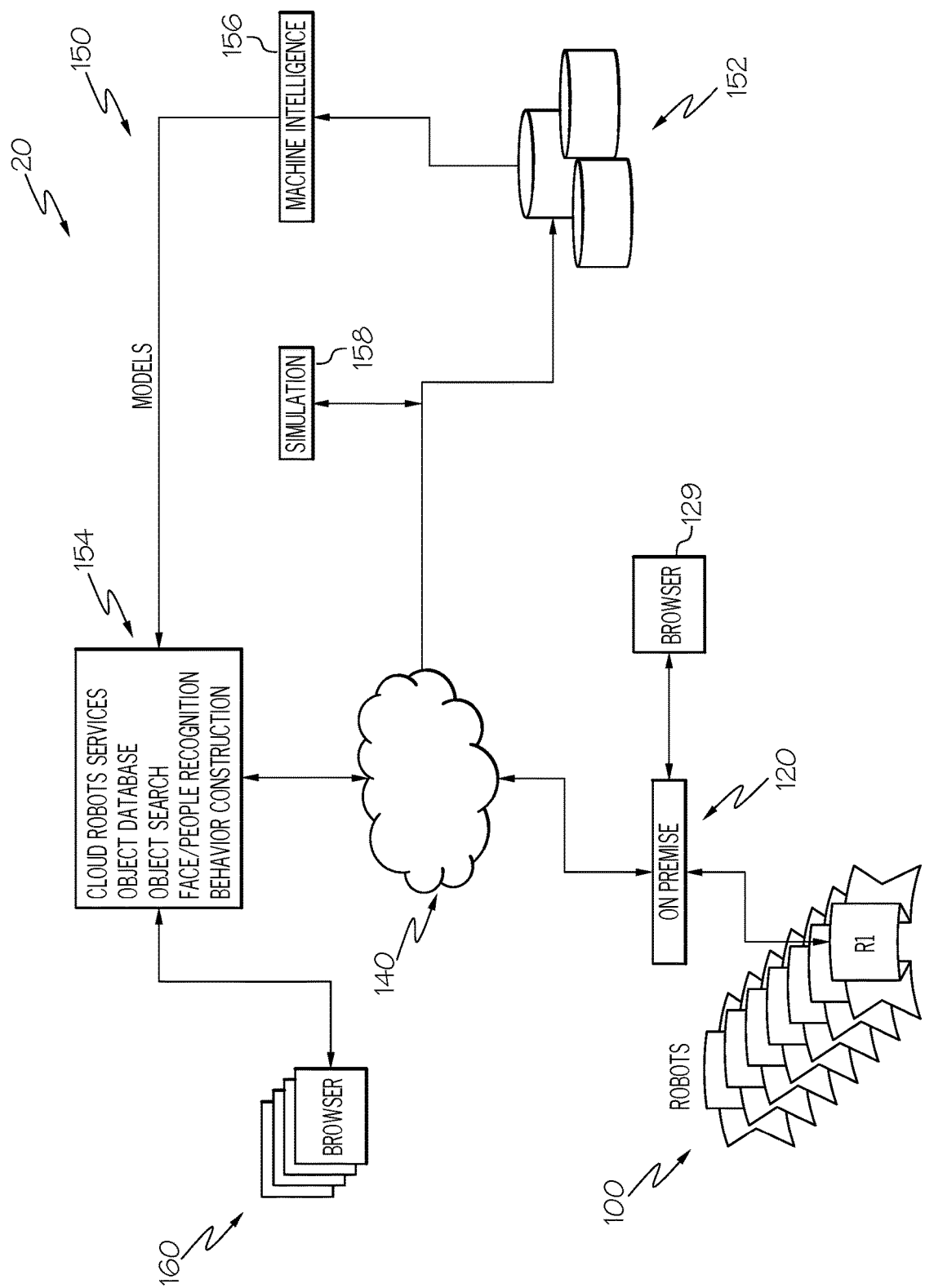
FIG. 2 schematically depicts illustrative components of a robot system according to one or more embodiments described and illustrated herein.

Referring also to FIG. 2, additional components of an illustrative remote cloud services system 150 of the robot system 20 is schematically illustrated. One or more robots 100 within an environment (e.g., the home 10) are communicatively coupled to the on-premise computing device 120. The on-premise computing device 120 may be configured or otherwise controlled locally, such as by a browser 129 as shown in FIG. 2. It should be understood that the on-premise computing device 120 may be locally controlled by other means, such as by a specific computer program.

The on-premise computing device 120 is communicatively coupled to a communications network 140, as described herein. The communications network 140 communicatively couples the on-premise computing device 120 to the remote cloud services system 150. The remote cloud services system 150 may include one or more databases 152 that receive raw data from the on-premise computing device 120. The remote cloud services system 150 may further include one or more computing devices 154 capable of accessing the raw data within the one or more databases 152 to perform the various computing processes described above to provide one or more cloud robot services such as, for example, an object database, an object search, facial recognition, person identification, behavior construction, trajectory planning, object recognition, object tracking, and object de-duplication. In some embodiments, machine intelligence 156 and/or simulation 158 processes may be utilized to perform one or more of the functionalities and computing processes described herein. In some embodiments, the cloud robot services computing device 154 may be administered or otherwise accessed by one or more browsers 160, particular computer programs, application programming interfaces, and/or the like.

In one example, the robot 100 communicates raw sensor data from the plurality of sensors 102 to the on-premise computing device 120. Raw sensor data from the one or more additional sensors (e.g., the first additional sensor 117A and the second additional sensor 117B shown in FIG. 1) may also be provided to the on-premise computing device 120. In this example, the on-premise computing device 120 performs a majority of the computing processes relating to object recognition, pose recognition, and object location detection. For example, the raw sensor data may include a plurality of images that the on-premise computing device 120 processes to perform the desired functionality, such as detecting the type of an object, the pose of the object, and the object's location within the environment. After the object type, the pose of the object, and the location of the object is determined, this information is sent to the remote cloud services system 150. At least some of the raw sensor data may also be transmitted to the remote cloud services system 150 for processing, such as for machine learning and/or verification purposes. The on-premise computing device 120 may also perform additional robot services, such as a de-duplication process described in more detail herein.

In another example, a majority of the computing processes are performed by the remote cloud services system 150 rather than the on-premise computing device 120. In yet another example, the computing processes are shared equally between the on-premise computing device 120 and the remote cloud services system 150.

Figure 3:
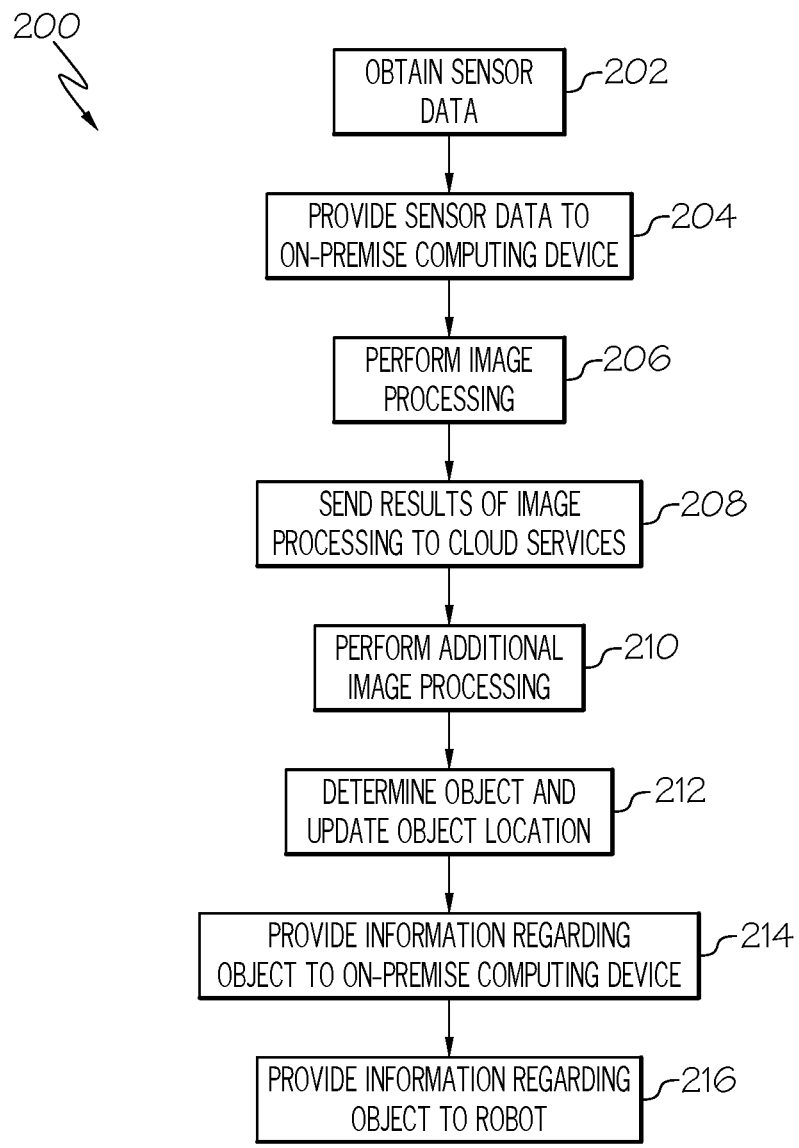
FIG. 3 graphically depicts a flowchart of an illustrative process of a workflow between a robot, an on-premise computing device, and a cloud services system according to one or more embodiments described and illustrated herein.

FIG. 3 graphically illustrates a non-limiting example workflow of data communication and computing tasks that may be completed by one or more of the various components of the robot system 20 (FIG. 1). Referring to FIGS. 1 and 3, the plurality of sensors 102 of the robot 100 and/or one or more additional sensors (e.g., the first additional sensor 117A and the second additional sensor 117B shown in FIG. 1) obtain raw sensor data at block 202. For example, the sensors may be activated to receive information such as images, depth information, or the like. At block 204, the on-premise computing device 120 receives the raw sensor data from the plurality of sensors 102 of the robot 100 and/or the one or more additional sensors. The on-premise computing device 120 may pre-process the raw sensor data to obtain pre-processed data at block 206 prior to sending the pre-processed data to the remote cloud services system 150 at block 208 (described further hereinbelow). For example, the on-premise computing device 120 may remove unnecessary information from the raw sensor data in generating the pre-processed data. That is, the on-premise computing device 120 may reduce the amount of raw sensor data prior to sending the data to the remote cloud services system 150 so as to avoid an unnecessarily large data transmission, avoid overtaxing the remote cloud services system 150, and/or the like. In a non-limiting example, a camera of the robot 100 may record a plurality of images of an object, such as, for example, a person's face. In some of the images, the person's face may be obscured such at least a portion thereof (e.g., the person's eyes) is out of view. The on-premise computing device 120 may only select images or frames that depict the person's eyes such that the images that are sent to the remote cloud services system 150 are satisfactory images for facial recognition algorithms. The remaining images may be stored locally or discarded. In this manner, the on-premise computing device 120 may reduce the amount of data that is uploaded to the remote cloud services system 150. Further, only high-quality data (i.e., data that is most likely to be used to perform the functionalities as described herein) is uploaded to the remote cloud services system 150 for processing.

At block 208, the on-premise computing device 120 sends the processed sensor data to the remote cloud services system 150. For example, the on-premise computing device 120 transmits the data via the communications network 140 to the remote cloud services system 150 using the second communications connection B and the third communications connection C. At block 210, after receiving the data from the on-premise computing device 120, the remote cloud services system 150 may perform various computing processes described herein, such as object recognition, de-duplication, and/or the like. Information such as the object type, object pose, and object location may be determined at block 212, and this information is provided to the on-premise computing device 120 at block 214. The object information may then be provided to the robot 100 by the on-premise computing device 120 at block 216. Thus, a majority of the computationally demanding processes are performed by the remote cloud services system 150 rather than the robot 100. It should be understood that embodiments are not limited to the computing distribution shown in FIG. 3, and that other computing distributions between the robot 100, the on-premise computing device 120 and the remote cloud services system 150 are contemplated.

Regardless of the computing distribution, the remote cloud services system 150 is further configured to develop and store an object library that may be referenced by the robots 100 within the robot system 20. The remote cloud services system 150 may receive image data from a set of images from one or more data sources. For example, the remote cloud services system 150 may access millions of images of objects from any source (e.g., from sources over the Internet) as training data to classify types of objects. Supervised or unsupervised learning may be performed by the remote cloud services system 150 to develop a library of objects. Additionally, data provided by the on-premise computing device 120 may also be used by the remote cloud services system 150 to develop the library of objects.

Each object within the library of objects has a plurality of attributes associated therewith. Illustrative attributes include, but are not limited to, dimensional information (i.e., length, width, and height), center of gravity, texture, features (e.g., holes, edges, protrusions, etc.), three-dimensional meshes, optimal grasp patterns, and/or the like, may be stored for each object within the library of objects. Thus, all of the robots 100 within the robot system 20 may utilize the library of objects provided by the remote cloud services system 150. When the robot 100 encounters an object in the environment, the remote cloud services system 150 and/or the on-premise computing device 120 may determine the object as an object that is saved in the library by comparing data obtained regarding the object with the library data. Various attributes of the saved object in the library may be applied to the detected object. Application of these stored attributes, such as dimensional attributes or the like, may reduce the amount of noise and error in the sensed data regarding the detected object. As a result, the robot 100 may have additional information that allows the robot 100 to more accurately determine various attributes that the object may have.

As the robot 100 traverses the environment, such as the home 10 depicted in FIG. 1, the robot 100, the on-premise computing device 120, and the remote cloud services system 150 cooperate to determine a location and a pose of various objects that are present within the environment. In this manner, when receiving an input from a user corresponding to a request to find an object, the robot 100 utilizes programming to locate the object and execute the optimal grasp pattern to grasp the object based on the pose of the object. In some embodiments, locations of particular objects may be stored by the remote cloud services system 150. Accordingly, the robot 100 may receive the locations of the objects from the remote cloud services system 150 through the on-premise computing device 120. Such objects may then be tracked within the environment.

Figure 4:
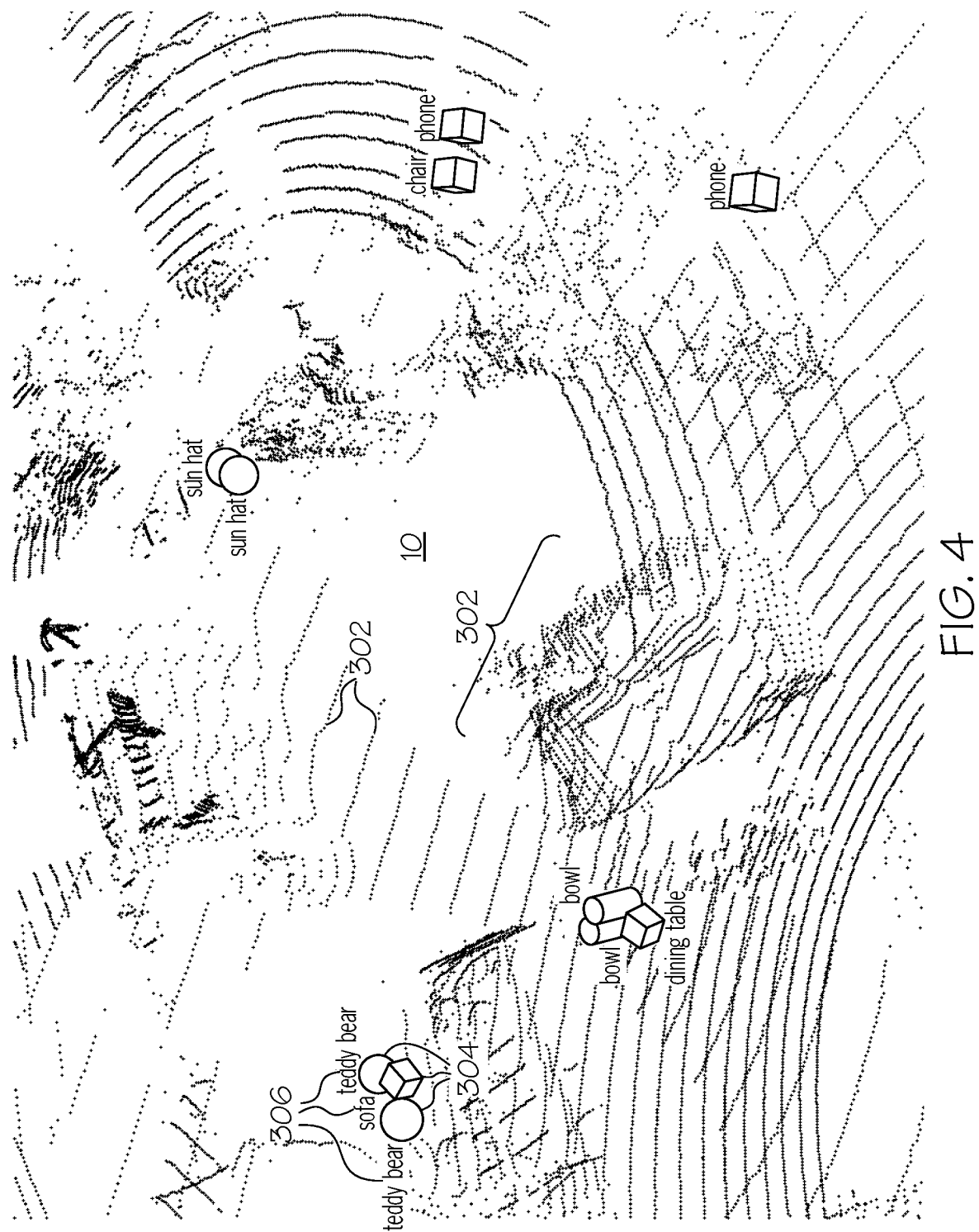
FIG. 4 schematically depicts a graphical representation of illustrative objects and their locations within a point cloud environment according to one or more embodiments described and illustrated herein.

In some embodiments, a computing device operated by the user may display graphical representations of a sensed location of where objects are located, as well as the pose of the objects within the environment. FIG. 4 depicts an illustrative graphical representation of various objects and their respective locations within an environment as determined by the robot 100 (FIG. 1). In some embodiments, the graphical representation of the objects may be overlaid on top of an image of the environment. While still referring to FIG. 1, in the example of FIG. 4, the dotted lines 302 represent a point cloud as determined by one or more Lidar sensors. The point cloud may represent various objects, features, and/or the like within the environment. One or more graphical representations 304 show the location of objects as determined by the robot 100, the on-premise computing device 120, and the remote cloud services system 150. The graphical representations 304 may be generic shapes that are color coded, or may be shapes that more closely approximate the actual objects. In some embodiments, the graphical representations 304 may also include icons that represent the actual objects. Further, labels 306 describing details of the objects may also be displayed, such as the type of object, characteristics of the objects, names of the objects, and/or the like. Other information may also be displayed, such as a time the last measurement of the object was taken, a description of the pose of the object, and/or any other information that may be of relevance. A user may click or otherwise select an object to display more information of the object to display a menu of operations that may be performed on the object and/or the like. Illustrative operations include, but are not limited to, retrieval of the object and delivery of the object to the user, movement of the object from its current location to another location, rearrangement of the object, movement closer to the object, and/or the like.

As stated herein, the remote cloud services system 150 provides a plurality of robot services. One illustrative, non-limiting robot service is a de-duplication of objects as detected by the robot 100. Certain sensors may not be one-hundred percent (100%) accurate, and may cause a detected location of an object to shift over time. For example, a first measurement corresponding to the location of an object using a camera sensor may be at a first location, but a second measurement may be at a second location that is shifted slightly with respect to the first location despite the fact that the object itself did not move. This may cause the robot 100 to incorrectly determine that there are two similar objects in close proximity to one another. Or, the robot 100 may determine that there is only one object, but the shifted location is incorrect in such a manner that the robot 100 is unable to provide commands to successfully grasp the object. Thus, embodiments of the present disclosure are also directed to systems and methods for the de-duplication of objects in such situations.

Figure 5:
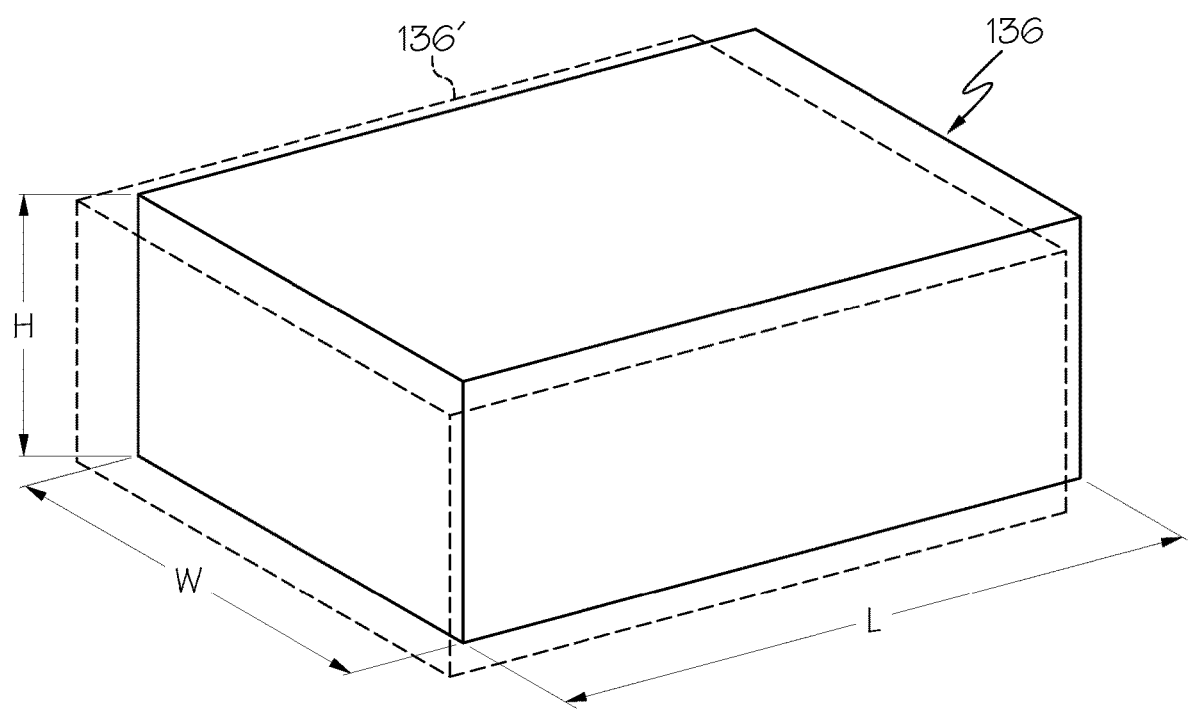
FIG. 5 schematically depicts illustrative measurements of an object as detected by a robot according to one or more embodiments described and illustrated herein.

In one non-limiting example of a de-duplication process, historical measurements of objects are used to determine a location and pose of an object together with a confidence value, where relatively recent measurements are given a greater weight than relatively older measurements. When the robot 100 encounters an object for the first time, the image data (and other data) of the object is stored with a relatively low confidence value. As a non-limiting example, if the confidence value is a number on a scale from 1 to 100, the initial confidence value may be about a 1. During the first measurement, dimensions of the object are determined. For example, referring to FIGS. 1 and 5, the length L, width W and height H of an object, such as a tissue box 136, may be determined. The measurement of the object may be compared with a plurality of objects stored within the library. For example, the volume of the detected object may be compared with volumes of objects stored within the library. The volume of an object stored in the library that most closely matches the detected object may be selected as the object. In FIG. 5, a representation 136' of a tissue box within the library of objects may closely match that of the tissue box 136 as detected by the sensors of the robot 100. Although the dimensions may not quite match, the representation 136' of the tissue box may be selected because it most closely correlates to other objects stored in the library. As an example and not a limitation, the comparison between volumes may be performed by a nearest point method. As stated above, a low confidence value is assigned when the robot 100 encounters the object for the first time.

During the second encounter with the object, a similar analysis is performed to determine the object as stored within the object library. If the object of the first encounter and the object of the second encounter are the same and their locations are different, the system determines an average of the two locations and increases the confidence value for the most recent measurement. During a third encounter with the object, a third location measurement is used as a tie breaker to determine which of the first two readings is more likely to be correct. The confidence value for the third measurement is increased over the previous two. Because objects may move slightly over time (e.g., because of the vibration caused by people walking through the house), the most recent measurement is deemed likely to be the most correct.

Thus, the previous measurements degrade over time. As a non-limiting example, previous measurements may be docked by a value (e.g., 0.9) while the current reading is assigned a value of 1. In some embodiments, the pose of the measured object is also compared to previous readings to verify the pose of the object. Thus, the robot 100 may determine that there is only one object even if there is a small amount of jitter observed by the one or more sensors 102. Further, measurements of the object by the robot 100 are taken from various points around the object as the robot 100 moves throughout the room 130 (e.g., obtained while the robot 100 moves towards another object). Thus, the location of the object may appear to change. However, small changes in location/pose are not indicative of movement of the object, or another object being placed in a slightly different location.

If a difference between the current location of the measured object and the previously measured location is relatively large (e.g., more than half the width or more than half the size of the object), then the robot system 20 accesses all of the saved angles of the object and the various poses of the object. This is performed to determine whether the detected object could be a second object sitting next to a previously detected object. If the currently measured object cannot fit a second object next to it based on the volume or other characteristics associated with the object, then the system determines that one of the measurements is incorrect. The confidence value of the previous measurement is lowered and the confidence value on the most recent measurement is increased. However, both measurements are saved. Subsequent measurements are also taken of the object to increase the confidence that it is a single object and not duplicate objects because they all take up the same volume.

In some cases, the robot system 20 may be aware that there are unique items within the environment for which there may be only one of such items. For example, there may only be one set of the user's keys. That is, there may not be two different instances of the user's keys at two different locations. In addition, the user's keys are different from any other person's keys. In such instances, the user may tag an object as a unique object so that the robot system 20 is programmed to recognize that the object is unique. The remote cloud services system 150 may then be programmed such that there can only be one instance of a unique item. In the case of unique items, the robot system 20 (e.g., the remote cloud services system 150 and/or the on-premise computing device 120) may not perform the volume checking steps described above. Rather, the most recent location measurement of the unique object is assumed to be the correct location. In some embodiments, the average location of several previous measurements may be determined. If there is a location measurement that is vastly different from the previous measurements, the most recent location measurement is taken as true and the old location measurements are invalid. Thus, the most recent location measurement will have the highest score. All the historical measurements may be saved in some embodiments for long term processing.

Embodiments of the present disclosure may also provide for region detection bubbles around detected objects. These region detection bubbles may be determined by the remote cloud services system 150, the on-premise computing device 120, and/or locally by the robot 100 itself. The region detection bubbles may account for an amount of error caused by the sensors 102 of the robot 100. Thus, the robot 100 may be programmed to recognize that there is an object within the region detection bubble, even in instances when the robot 100 cannot precisely locate the object within the region detection bubble.

One or more outputs from the plurality of sensors 102 of the robot 100 may be inherently noisy. For example, a sensor 102 located on a head portion of a robot 100 may be known to provide noisy or unreliable outputs at a particular level of accuracy, particularly when the robot 100 is moving and the sensor 102 may be vibrating due to the movement of the robot 100. As such, the accuracy of the plurality of sensors 102 may be determined before the sensors 102 provide outputs. As an example, a particular sensor 102 may be known to be accurate within a certain distance at a particular depth (e.g., accuracy of 1 meter). When an object is detected at that depth using the particular sensor 102, a sphere having a radius r of the accuracy distance may be placed around a measured center of the object. The region detection bubble may be defined by the sphere. Thus, the robot 100 may be programmed to recognize that there is an object within the sphere.

Figure 6:
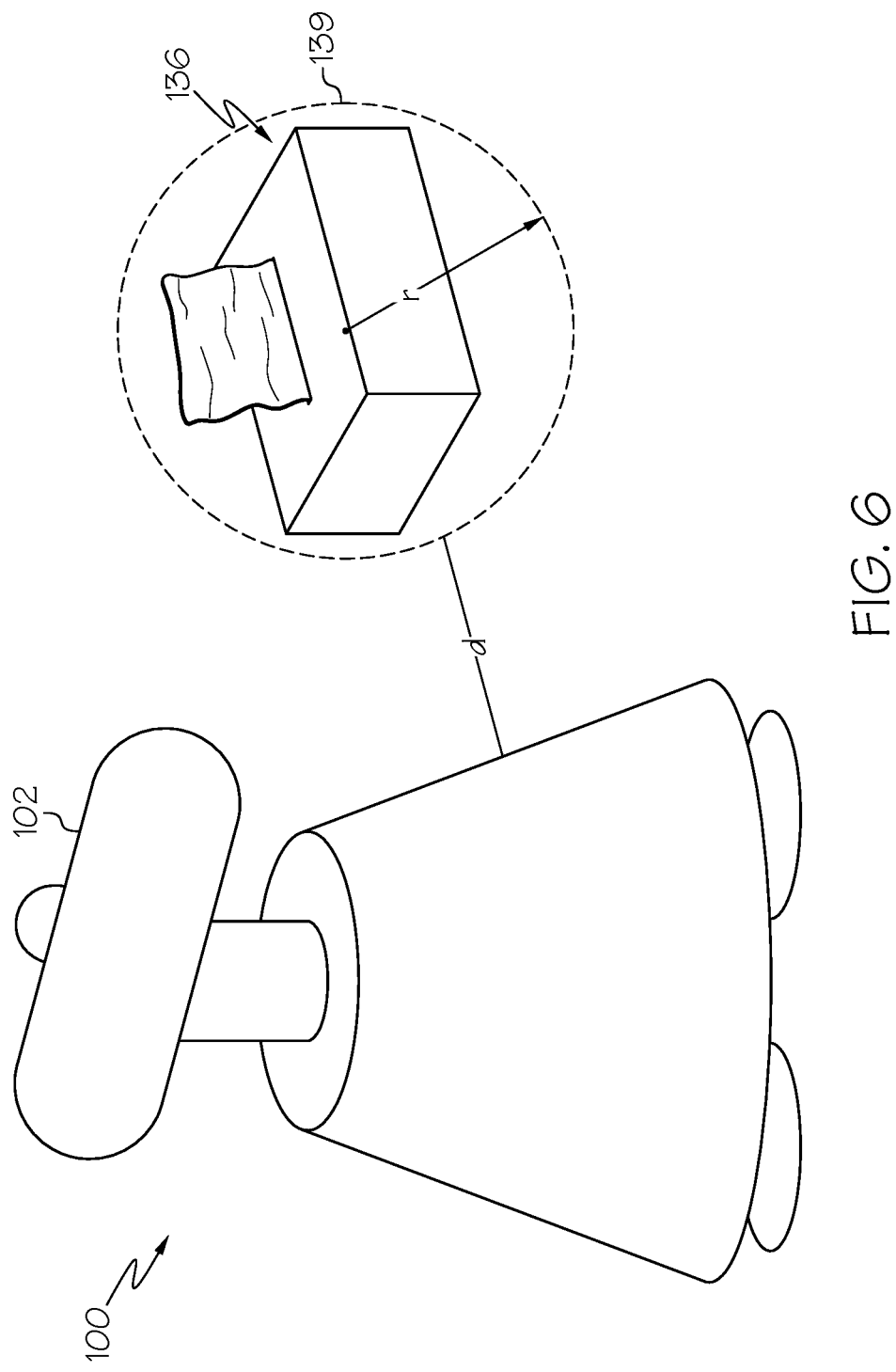
FIG. 6 schematically depicts an illustrative object surrounded by a region detection bubble according to one or more embodiments described and illustrated herein.

Referring to FIG. 6, a tissue box 136 is detected by a sensor 102 having a particular accuracy. The sensor 102 may be accurate within a distance d. Thus, the robot system 20 positions a sphere defining a region detection bubble 139 having a radius r that is equal to the distance d.

Referring again to FIG. 1, the remote cloud services system 150 may also perform various other functionalities. As a non-limiting example, the on-premise computing device 120 may transmit voice data representing oral commands of the user to the remote cloud services system 150. The remote cloud services system 150 may then use one or more voice recognition and/or natural language processing algorithms to translate the voice data into computer-readable instructions. The remote cloud services system 150 may then act on the computer-readable instructions and deliver the results of the action to the robot 100 through the on-premise computing device 120.

Additionally, path planning may be performed by the remote cloud services system 150. For example, the user may provide an instruction to the robot 100 that is sent to the remote cloud services system 150. The remote cloud services system 150 may receive the instructions, determine tasks to be completed by the robot 100, and perform tasks such as path planning and grasp pattern planning based on modeling or any other method of generating path and grasp patterns for the purposes of executing the determined tasks. The instructions corresponding with the path plan and/or grasp pattern are then sent to the robot 100 through the on-premise computing device 120. In some embodiments, the on-premise computing device 120 performs both path planning and grasp pattern planning. In some embodiments, the on-premise computing device 120 and the remote cloud services system 150 may collectively perform the path planning and grasp pattern planning.

In some embodiments, the information sent to the remote cloud services system 150 may be limited for privacy reasons. For example, no actual images may be sent to the remote cloud services system 150. Rather, only data representing the images may be sent to the remote cloud services system 150. As part of the image processing performed by the on-premise computing device 120, personal information may be removed such that no image data is sent. As an example, the remote cloud services system 150 may contain data relating to evidence of a soda can at a particular location in the home, but it will not have an actual image of the soda can or the area surrounding the soda can.

Additionally, the robot system 20 may authenticate users based on 3D location information. Thus, a user may only access the functionalities of the remote cloud services system 150 and the robot system 20 generally if the user is standing in close proximity to the robot 100. Close proximity may be, for example, within a particular distance from the robot 100, in the same room 130 as the robot 100, in the same building as the robot 100, or the like. In another example, a remote user may describe known objects in the home 10 to the robot system 20. For example, the user may say "There is a soda can at the left corner of the table." The robot 100 may then obtain information to confirm that this is true and then provide additional information about the home 10 because the user just proved that he or she knows something specific about the home 10. The use may remotely access the robot system 20 using a mobile device and the Internet, for example.

In some embodiments, users may be paid or offered some compensation for training the robot 100. For example, the user may agree to tell the robot 100 "this is a mug" and then show the robot 100 all of the mugs that the user owns in the home 10 in various poses. Further, users may tag objects within the environment. For example, the user may say "These are my keys," or "This is my computer." The robot system 20 may then associate the tag with the sensor data corresponding to the tagged object. The robot system 20 may be configured to extract background images from the object being tagged. For example, the robot system 20 may extract a set of keys from a user's hands and arms.

Figure 7:
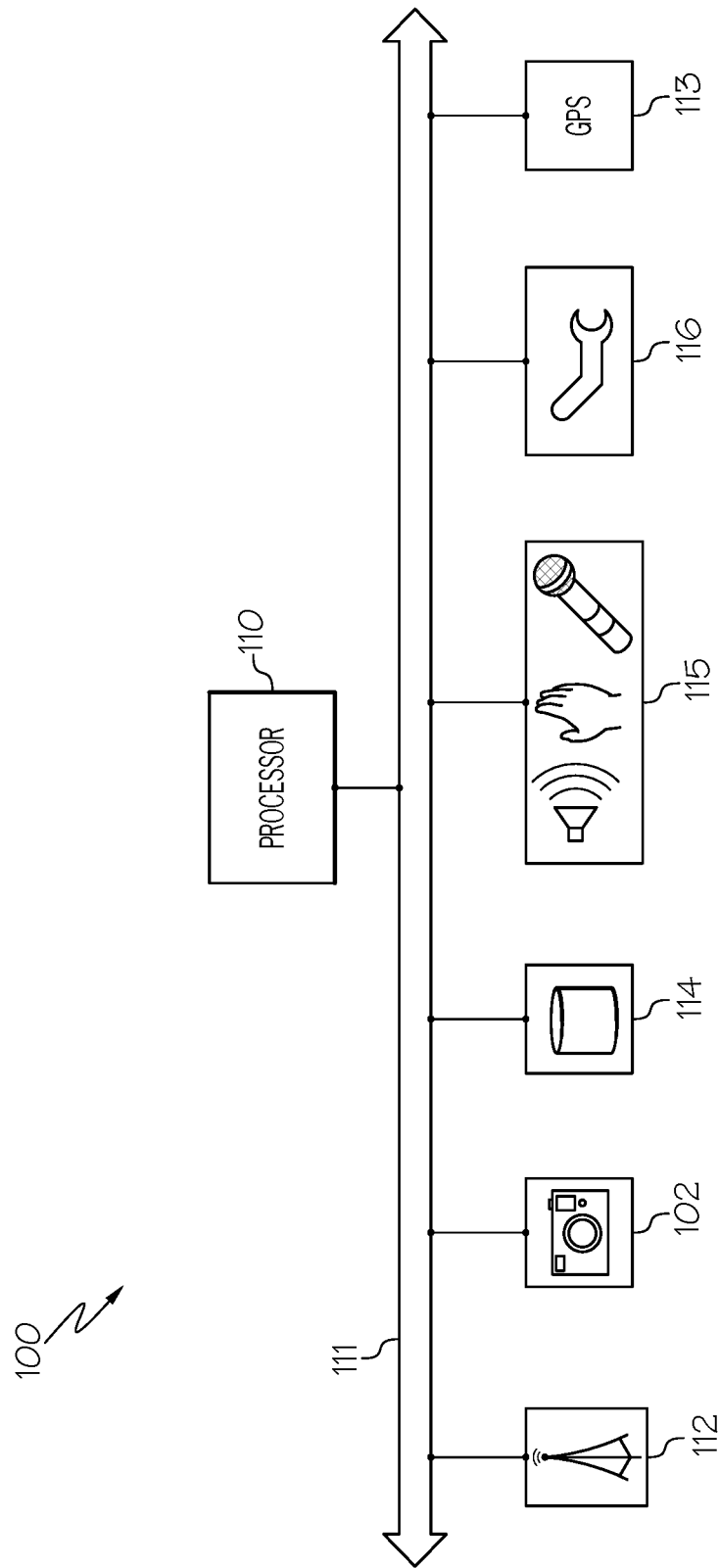
FIG. 7 schematically depicts illustrative components of a robot according to one or more embodiments described and illustrated herein.

Referring now to FIG. 7, components of an illustrative robot 100 capable of performing the functionalities described herein are schematically illustrated. It should be understood that the robot 100 may include more components than are illustrated by FIG. 7, and that FIG. 7 is provided for illustrative purposes only. The illustrative robot 100 generally includes a processor 110 a communication path 111, network interface hardware 112, a plurality of sensors 102, one or more memory modules 114, a plurality of input and output devices 115, a plurality of actuators 116, and a location sensor 113.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 includes a combination of conductive traces, conductive wires, connectors, and buses that cooperate to permit the transmission of electrical data signals to components such as processors, memories, sensors, input devices, output devices, and communication devices, including the various components described herein. Accordingly, the communication path 111 may be a bus in some embodiments. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and/or the like.

The processor 110 of the robot 100 may be any device capable of executing machine-readable instructions, such as the machine-readable instructions for performing the various functionalities described herein. Accordingly, the processor 110 may be a controller, an integrated circuit, a microchip, a computer, or any other computing device. The processor 110 is communicatively coupled to the other components of the robot 100 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data. It should be understood that while the embodiment depicted in FIG. 7 includes a single processor 110, other embodiments may include more than one processor.

The network interface hardware 112 is coupled to the communication path 111 and communicatively coupled to the processor 110. The network interface hardware 112 may be any device capable of transmitting and/or receiving data via the communications network 140. Accordingly, the network interface hardware 112 can include a wireless communication module configured as a communication transceiver for sending and/or receiving any wired or wireless communication. For example, the network interface hardware 112 may include an antenna, a modem, LAN port, Wi-Fi card, WiMax card, mobile communications hardware, near-field communications hardware, satellite communications hardware and/or any wired or wireless hardware for communicating with other networks and/or devices. In one embodiment, network interface hardware 112 includes hardware configured to operate in accordance with a wireless communications protocol such as Bluetooth, Zigbee, Z-wave, an 802.11 standard, and/or the like. In another embodiment, network interface hardware 112 may include a Bluetooth send/receive module for sending and receiving Bluetooth communications to/from a portable electronic device. The network interface hardware 112 may also include a radio frequency identification ("RFID") reader configured to interrogate and read RFID tags. The network interface hardware 112 is used to communicate with the on-premise computing device 120.

The plurality of sensors 102 may be communicatively coupled to the processor 110. As previously described herein, the plurality of sensors 102 may include any type of sensors capable of providing the robot 100 with information regarding the environment. The plurality of sensors 102 may include, but is not limited to, cameras (e.g., CCD cameras), infrared sensors, depth sensors, proximity sensors, tactile sensors, Lidar sensors, radar sensors, time of flight sensors, inertial measurement units (e.g., one or more accelerometers and gyroscopes) and/or the like. As described herein, sensor data is communicated to the on-premise computing device 120.

The memory module 114 of the robot 100 is coupled to the communication path 111 and communicatively coupled to the processor 110. The memory module 114 may include RAM, ROM, flash memories, hard drives, or any non-transitory memory device capable of storing machine-readable instructions such that the machine-readable instructions can be accessed and executed by the processor 110. The machine-readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, and/or the like, that may be compiled or assembled into machine-readable instructions and stored in the memory module 114. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It should be understood that while the embodiment depicted in FIG. 7 includes a single memory module 114, other embodiments may include more than one memory module. The memory module 114 may also store sensor data as described herein.

The input and output devices 115 may include any number of input devices and output devices. Illustrative input devices include, but are not limited to, keyboards, buttons, switches, knobs, touchpads, touch screens, microphones, infrared gesture sensors, mouse devices, and the like. Example output devices include, but are not limited to, speakers, electronic displays, lights, light emitting diodes, buzzers, tactile displays, and the like.

The plurality of actuators 116 may include any mechanical actuators that enable the robot 100 to navigate a space and manipulate objects. The actuators may include motorized wheel assemblies that cause the robot 100 to move within the space. Actuators may also include motors that are controlled to move arms and end effectors of the robot 100 to grasp and manipulate objects. Such actuators 116 are generally understood and are not described in greater detail herein.

The location sensor 113 is coupled to the communication path 111 and thus communicatively coupled to the processor 110. The location sensor 113 may be any device capable of generating an output indicative of a location. In some embodiments, the location sensor 113 includes a global positioning system (GPS) sensor, though embodiments are not limited thereto. In some embodiments, the location sensor 113 may utilize a wireless protocol, such as an 802.11 standard, Bluetooth, and/or the like for the purposes of providing location coordinates. Some embodiments may not include the location sensor 113, such as embodiments in which the robot 100 does not determine a location of the robot 100 or embodiments in which the location is determined in other ways (e.g., based on information received from other equipment). The location sensor 113 may also be configured as a wireless signal sensor capable of triangulating a location of the robot 100 and the user by way of wireless signals received from one or more wireless signal antennas.

It should be understood that the robot 100 may include other components not depicted in FIG. 7. For example, the robot 100 may be powered by a battery. The battery may be any device capable of storing electric energy for later use by the robot 100. In some embodiments, the battery is a rechargeable battery, such as, for example, a lithium-ion battery or a nickel-cadmium battery. In embodiments in which the battery is a rechargeable battery, the robot 100 may include a charging port, which may be used to charge the battery.

Figure 8:
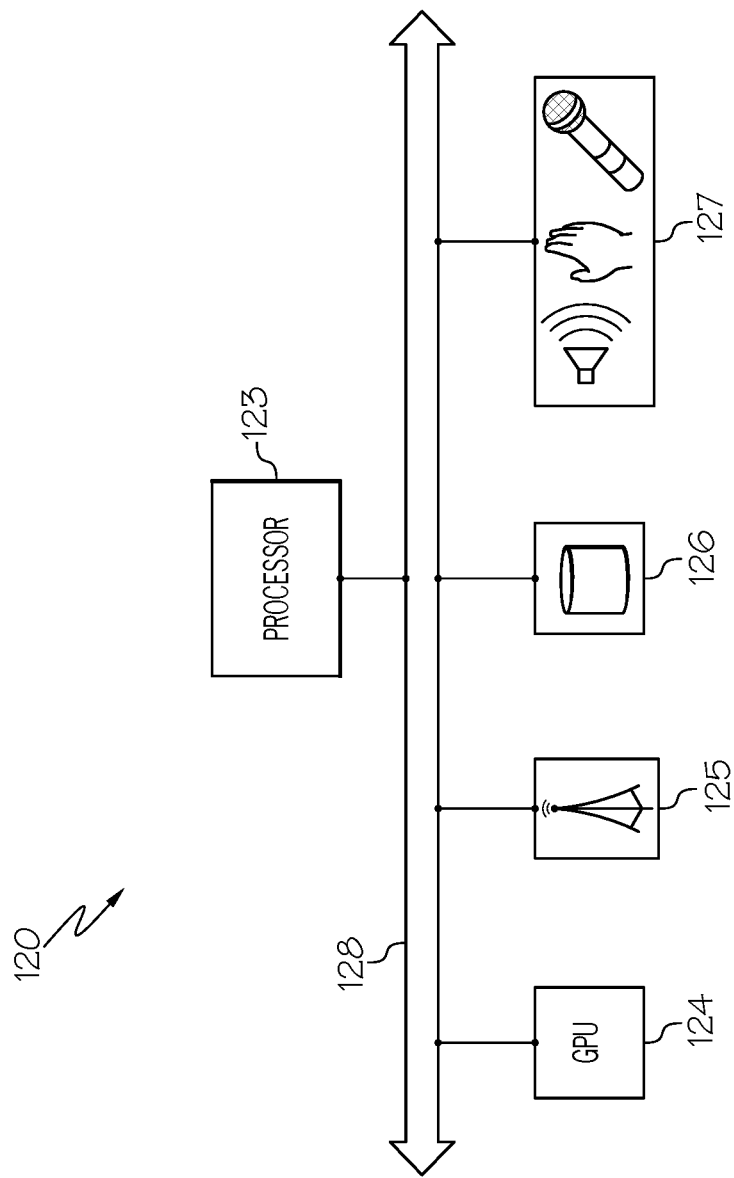
FIG. 8 schematically depicts illustrative components of an on-premise computing device according to one or more embodiments described and illustrated herein.

Referring now to FIG. 8, components of an on-premise computing device 120 are schematically illustrated. It should be understood that the on-premise computing device 120 may include more components than are illustrated by FIG. 8, and that FIG. 8 is provided for illustrative purposes only. The illustrative on-premise computing device 120 generally includes a processor 123, a communication path 128, a graphics processing unit 124, network interface hardware 125, one or more memory modules 126, and a plurality of input and output devices 127.

The communication path 128 may be formed from any medium that is capable of transmitting a signal such as, for example, conductive wires, conductive traces, optical waveguides, or the like. Moreover, the communication path 128 may be formed from a combination of mediums capable of transmitting signals. In one embodiment, the communication path 128 includes a combination of conductive traces, conductive wires, connectors, and buses that cooperate to permit the transmission of electrical data signals to components such as processors, memories, sensors, input devices, output devices, and communication devices, including the various components described herein. Accordingly, the communication path 128 may be a bus in some embodiments. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 128 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and/or the like.

The processor 123 may be any device capable of executing machine-readable instructions to perform the various functionalities described herein. Accordingly, the processor 123 may be a controller, an integrated circuit, a microchip, a computer, or any other computing device. The processor 123 is communicatively coupled to the other components of the on-premise computing device 120 by the communication path 128. Accordingly, the communication path 128 may communicatively couple any number of processors with one another, and allow the components coupled to the communication path 128 to operate in a distributed computing environment. Specifically, each of the components may operate as a node that may send and/or receive data. It should be understood that while the embodiment depicted in FIG. 8 includes a single processor 123, other embodiments may include more than one processor 123.

The graphics processing unit 124 is any device capable of executing machine-readable instructions and specifically configured for performing image processing tasks, such as object recognition. The graphics processing unit 124 may be a controller, an integrated circuit, a microchip, a computer, or any other computing device. Any known or yet-to-be-developed graphics processing unit may be utilized. In some embodiments, no graphics processing unit 124 is utilized. Rather, the processor 123 may handle the imaging processing computations, as well as other computations as needed.

The network interface hardware 125 is coupled to the communication path 128 and communicatively coupled to the processor 123. The network interface hardware 125 may be any device capable of transmitting and/or receiving data via the communications network 140. Accordingly, the network interface hardware 125 can include a wireless communication module configured as a communication transceiver for sending and/or receiving any wired or wireless communication. For example, the network interface hardware 125 may include an antenna, a modem, LAN port, Wi-Fi card, WiMax card, mobile communications hardware, near-field communications hardware, satellite communications hardware and/or any wired or wireless hardware for communicating with other networks and/or devices. In one embodiment, network interface hardware 125 includes hardware configured to operate in accordance with a wireless communications protocol such as Bluetooth, Zigbee, Z-wave, an 802.11 standard, and/or the like. In another embodiment, network interface hardware 125 may include a Bluetooth send/receive module for sending and receiving Bluetooth communications to/from a portable electronic device. The network interface hardware 125 may also include a radio frequency identification ("RFID") reader configured to interrogate and read RFID tags. The network interface hardware 125 is used to communicate with the robot 100 and the remote cloud services system 150.

The memory module 126 of the on-premise computing device 120 is coupled to the communication path 128 and communicatively coupled to the processor 123. The memory module 126 may include RAM, ROM, flash memories, hard drives, or any non-transitory memory device capable of storing machine-readable instructions such that the machine-readable instructions can be accessed and executed by the processor 123. The machine-readable instructions may include logic or algorithm(s) written in any programming language of any generation (e.g., 1GL, 2GL, 3GL, 4GL, or 5GL) such as, for example, machine language that may be directly executed by the processor 123, or assembly language, object-oriented programming (OOP), scripting languages, microcode, and/or the like, that may be compiled or assembled into machine-readable instructions and stored in the memory module 126. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It should be understood that while the embodiment depicted in FIG. 8 includes a single memory module 126, any number of memory modules may be provided. The memory module 126 may also store sensor data as described herein.

The input and output devices 127 may include any number of input devices and output devices. Illustrative input devices include, but are not limited to, keyboards, buttons, switches, knobs, touchpads, touch screens, microphones, infrared gesture sensors, mouse devices, and the like. Example output devices include, but are not limited to, speakers, electronic displays, lights, light emitting diodes, buzzers, tactile displays, and the like.

The on-premise computing device 120, in addition to providing local robot and human interface, may also act as a hub for other systems within the environment, provide an always-powered (as opposed to battery powered) web server that can continuously send metered data to the cloud, provide local graphical user interfaces, and enable a reduction of on-robot computing and storage. Many intelligence tasks may require graphics processing unit (GPU) processing which is power intensive. Further, the on-premise computing device 120 may be a high-throughput pipe to the robot 100, which can provide image processing and various other tasks before uploading to the cloud. The data may be selectively transmitted (e.g., streamed) from the robot 100 to the on-premise computing device 120 based on the needs of the cloud services system 150. The cloud services system 150 may also control flow to particular services, such as Machine Intelligence services and a variety of data storage services.

In some embodiments, a robot operating system (ROS) is provided on the robot. That is, the robot has software that is configured to discover the on-premise computing device 120 so that the robot may register with the on-premise computing device 120 such as, without limitation, using multicast domain name system (MDNS) discovery, and GRPC registration. When registration occurs, the on-premise computing device may become a client of the ROS master running within the robot (e.g., via websockets (GRPC when there is a bridge)). The on-premise computing device 120 may then discover available services, behaviors, and topics and present such available services, behaviors, and topics on the on-premise service graphical user interface and/or push that information to the cloud services system 150 (e.g., via GRPC).

The cloud services system 150 may then request the collection of requested topics, and the on-premise computing device 120 may begin to stream the data, such as, without limitation, into Kinesis Streams. The streamed data may then be processed by many devices and data can be recorded into a collection of storage devices.

It should now be understood that embodiments described herein are directed to robot systems including a robot, an on-premise computing device in communication with the robot, and a cloud services system in communication with the on-premise computing device. The on-premise computing device and the cloud services system off-load processing requirements from the robot such that the robot may function more efficiently, consume less electrical energy and operate for longer periods of time on a single battery charge. The on-premise computing device may receive sensor data from the robot and provide selected sensor data to the cloud services system. The cloud services system may then perform energy-intensive object recognition and other processes. The results of these processes are then sent from the cloud services system to the on-premise computing device and then to the robot. The cloud services system may provide additional services, such as de-duplication of objects, path planning, simulation, modeling, machine learning, and/or the like.

Embodiments therefore enable robots to learn from one another by sending and storing data in the cloud. For instance, robots may build a context around self-generated models. These models may then get pushed, indexed, and published. Other data, like telemetry, imagery, and audio may also be pushed into a single collective that is able to leverage the cloud to apply machine learning and/or artificial intelligence functionality. This learning may create models that can be applied on-robot, to make it more efficient and intelligent in on-premise interactions. Additionally, services such as facial, speech and object recognition can use the computational power available in the cloud.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An on-premise computing device comprising a processor and a non-transitory memory device storing machine-readable instructions that, when executed by the processor, cause the processor to:
   receive raw sensor data from a robot;
   pre-process the raw sensor data to remove unnecessary information from the raw sensor data and obtain pre-processed data;
   transmit the pre-processed data to a cloud services system;
   receive, from the cloud services system, an object type, an object pose, and an object location of an object corresponding to the pre-processed data; and
   transmit a signal to the robot based on at least one of the object type, the object pose, and the object location of the object, the signal comprising one or more instructions usable by the robot to manipulate the object.

2. The on-premise computing device of claim 1, wherein a size of the pre-processed data is less than a size of the raw sensor data.

3. The on-premise computing device of claim 1, wherein the machine-readable instructions further cause the processor to receive path planning instructions from the cloud services system and transmit the path planning instructions to the robot.

4. The on-premise computing device of claim 1, wherein the machine-readable instructions that cause the processor to receive the raw sensor data from the robot further cause the processor to receive the raw sensor data from a co-located robot.

5. The on-premise computing device of claim 1, wherein the machine-readable instructions further cause the processor to receive a command via a user interface prior to receiving the raw sensor data from the robot, wherein the command corresponds to an instruction for the robot to perform a task.

6. The on-premise computing device of claim 1, wherein the raw sensor data comprises data corresponding to the object and a region detection bubble around the object.

7. The on-premise computing device of claim 1, wherein the machine-readable instructions further cause the processor to authenticate a user prior to receiving the raw sensor data from the robot, wherein the user is authenticated by comparing an input from the user that corresponds to known objects in an area adjacent to the robot with stored information regarding the known objects.

8. The on-premise computing device of claim 1, wherein the object type is derived from tagged object data corresponding to objects that have previously been tagged by a user.

9. A cloud services system comprising a processor and a non-transitory memory device storing machine-readable instructions that, when executed by the processor, cause the processor to:
   receive pre-processed data from an on-premise computing device, wherein the pre-processed data is data that has been extracted by the on-premise computing device from raw sensor data that originated from a robot;
   determine an object type, an object pose, and an object location of an object from the pre-processed data;
   transmit the object type, the object pose, and the object location to the on-premise computing device;
   generate instructions for causing the robot to manipulate the object; and
   transmit the instructions to the on-premise computing device.

10. The cloud services system of claim 9, wherein the pre-processed data is image data and the object type and the object pose are determined by applying an object recognition algorithm to the image data.

11. The cloud services system of claim 9, wherein the machine-readable instructions further cause the processor to perform a de-duplication process that evaluates a plurality of historical measurements of an object to determine if a current object is:
   a same object as one or more historical measurements of the plurality of historical measurements, or
   a second object that is different from the object.

12. The cloud services system of claim 9, wherein the machine-readable instructions further cause the processor to:
   generate a robot path plan, and
   transmit the robot path plan to the on-premise computing device.

13. The cloud services system of claim 9, wherein the machine-readable instructions further cause the processor to authenticate a user prior to receiving the pre-processed data from the on-premise computing device, wherein the user is authenticated by comparing an input from the user that corresponds to known objects in an area adjacent to the robot with stored information regarding the known objects.

14. The cloud services system of claim 9, wherein the object type is determined from tagged object data corresponding to objects that have previously been tagged by a user.

15. A method of controlling a robot, the method comprising:
   receiving raw sensor data from the robot at an on-premise computing device;
   reducing, by the on-premise computing device, a size of the raw sensor data to generate processed sensor data;
   transmitting, by the on-premise computing device, the processed sensor data to a cloud services system;
   receiving, by the on-premise computing device, an object type, an object pose, and an object location from the cloud services system, wherein the object type, the object pose, and the object location is determined by the cloud services system from the processed sensor data; and
   transmitting, by the on-premise computing device, a signal to the robot based on at least one of the object type, the object pose, and the object location of the object, the signal comprising one or more instructions usable by the robot to manipulate the object.

16. The method of claim 15, wherein the object type and the object pose are determined by an object recognition algorithm.

17. The method of claim 15, wherein receiving the object type, the object pose, and the object location comprises receiving information about the object that is generated as a result of a de-duplication process that evaluates a plurality of historical measurements of the object to determine if a current object is a same object as one or more historical measurements of the plurality of historical measurements or a different object.

18. The method of claim 15, further comprising receiving a command via a user interface prior to receiving the raw sensor data from the robot, wherein the command corresponds to an instruction for the robot to perform a task.

19. The on-premise computing device of claim 1, wherein the pre-processed data is image data and the object type and the object pose are determined by the cloud services system applying an object recognition algorithm to the image data.

20. The method of claim 15, further comprising:
   receiving, by the on-premise computing device, path planning instructions from the cloud services system; and
   transmitting the path planning instructions to the robot.

* * * * *

UNITED STATES PATENT AND TRADEMARK OFFICE
CERTIFICATE OF CORRECTION

PATENT NO. : 10,723,027 B2
APPLICATION NO. : 16/053165
DATED : July 28, 2020
INVENTOR(S) : Matthew Amacker, Arshan Poursohi and Allison Thackston Page 1 of 1

It is certified that error appears in the above-identified patent and that said Letters Patent is hereby corrected as shown below:

On the Title Page

Column 1, item (72), inventor 2, delete "Berkley" and insert --Berkeley--, therefor.

Column 2, item (74), Attorney, Agent, or Firm, delete "Dinsmore &Shohl LLC" and insert --Dinsmore & Shohl LLP--, therefor.

Column 2, item (56), U.S. Patent Documents, cite No. 1, delete "Li" and insert --Li et al.--, therefor.

Column 2, item (56), U.S. Patent Documents, cite No. 2, delete "Hickman" and insert --Hickman et al.--, therefor.

Column 2, item (56), U.S. Patent Documents, cite No. 4, delete "Hickman" and insert --Hickman et al.--, therefor.

Column 2, item (56), U.S. Patent Documents, cite No. 6, delete "Saunders" and insert --Saunders et al.--, therefor.

In page 2, Column 1, item (56), U.S. Patent Documents, cite No. 1, delete "Bingham" and insert --Bingham et al.--, therefor.

Signed and Sealed this
Twentieth Day of October, 2020

Andrei Iancu
*Director of the United States Patent and Trademark Office*